No. 848,160. PATENTED MAR. 26, 1907.
D. E. DAMPMAN.
FLOOR SCRAPER.
APPLICATION FILED JAN. 19, 1907.
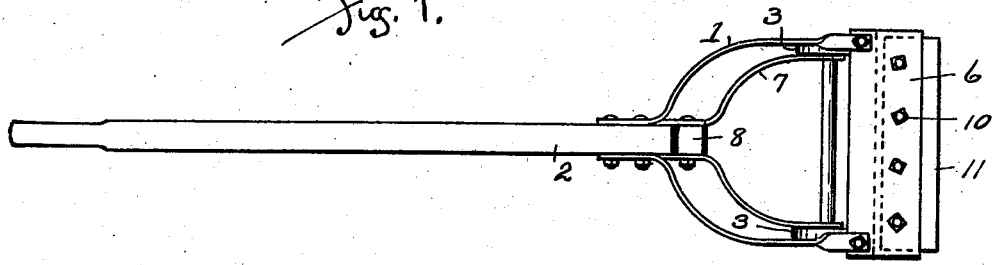
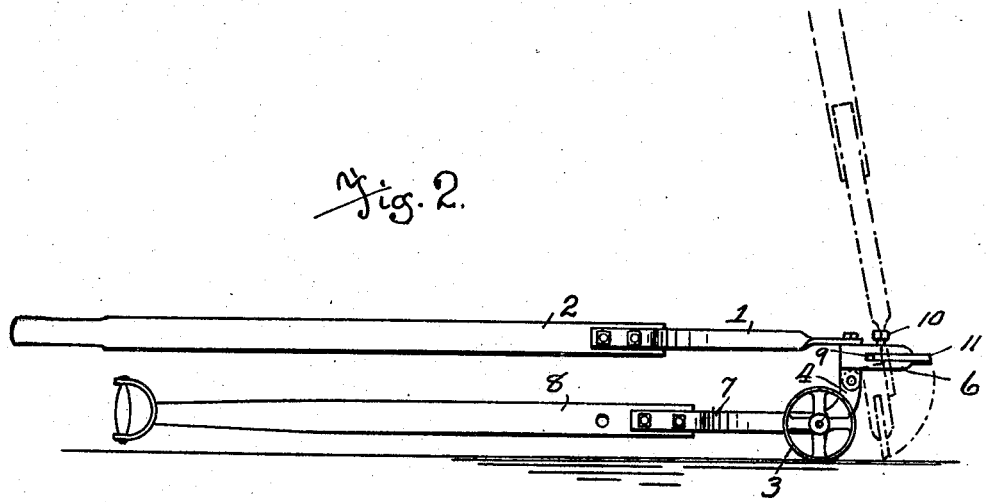
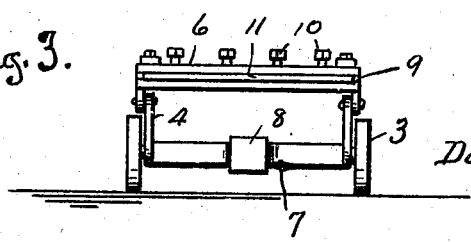
David E. Dampman,
Inventor

UNITED STATES PATENT OFFICE.

DAVID E. DAMPMAN, OF READING, PENNSYLVANIA.

FLOOR-SCRAPER.

No. 848,160.  Specification of Letters Patent.  Patented March 26, 1907.

Application filed January 19, 1907. Serial No. 353,067.

*To all whom it may concern:*

Be it known that I, DAVID E. DAMPMAN, a citizen of the United States, residing at Reading, in the county of Berks and State of Pennsylvania, have invented certain new and useful Improvements in Floor-Scrapers, of which the following is a specification.

This invention relates to improvements in floor-scrapers; and the object of the present invention is to provide a device by means of which floors, and more particularly hardwood floors, may be easily, rapidly, and evenly dressed.

The invention consists of a truck having an operating-handle and a frame mounted on said truck carrying the scraper and a handle for presenting said scraper to the floor-surface.

The device is such that wood floors made up of pieces in which the grain runs in different directions may be evenly dressed with ease.

The invention is more fully described in the following specification and clearly illustrated in the accompanying drawing, in which—

Figure 1 is a plan view, Fig. 2 is a side elevation, and Fig. 3 is a front end view, of my device.

The numeral 1 designates the truck-frame, 2 the operating-handle secured thereto, and 3 is a pair of wheels on which the truck travels. The frame 1 is formed with an upwardly-curved extension 4 at both of its front ends, and between the extremities of these extensions is pivotally mounted the scraper-holding bar 6. This bar is secured permanently near either end to a frame 7, and the said frame is provided with an operating-handle 8. The bar 6 is formed with a longitudinal groove 9 in its one edge and with a series of set-screws 10, which screws pass through one side and enter said groove.

The numeral 11 designates the scraper. This scraper is located in the groove 9, with the cutting edge projecting the desired distance beyond the edge of the bar, and the set-screws 10 when drawn up will securely hold it in the desired position. The scraper may be sharpened at both sides and may be reversed, allowing either edge to be used.

In operating the device the handle 2 is taken in the one hand and the truck pushed forward to the place to be operated on. The handle 8 is taken in the other hand and raised, turning the scraper-bar on its pivotal connection with the truck-frame and bringing the edge of the scraper in contact with the floor-surface. By pulling the truck forward the scraper will remove all uneven spots and cause the surface to be evenly dressed. The pressure of the scraper against the floor-surface is regulated by the operating-handle 8.

Having thus fully described my invention and its operation, what I claim, and desire to secure by Letters Patent, is—

1. In a floor-scraper a truck provided with a frame mounted on a pair of wheels and having an operating-handle secured thereto, said frame having extension ends, a grooved scraper-bar pivotally mounted between said extension ends, a frame secured to said bar, an operating-handle secured to said frame, a removable double-edge scraper located in said groove and means for adjusting said scraper.

2. In a floor-scraper a frame mounted on a pair of wheels and provided with an operating-handle, said frame having its ends perforated, a grooved scraper-bar pivotally mounted between said perforated ends, a U-shaped frame secured to said bar near either end, an operating-handle secured to said frame, a double-edge scraper located in said grooved bar, and means for adjusting said scraper.

In testimony whereof I have signed my name to this specification in the presence of two subscribing witnesses.

DAVID E. DAMPMAN.

Witnesses:
 ED. A. KELLY,
 M. C. KREIDER.